United States Patent
Mc Ginley et al.

(10) Patent No.: US 10,834,609 B2
(45) Date of Patent: Nov. 10, 2020

(54) OPTIMAL WIRELESS ROUTER POSITIONING

(71) Applicant: Avast Software s.r.o., Prague (CZ)

(72) Inventors: Maurice Mc Ginley, Haarlem (NL); Jeroen De Knijf, Amsterdam (NL); Gerardus Fransiscus Johannes van der Kruis, Eindhoven (NL)

(73) Assignee: Avast Software s.r.o., Prague (CZ)

( * ) Notice: Subject to any disclaimer, the term of this patent is extended or adjusted under 35 U.S.C. 154(b) by 0 days.

(21) Appl. No.: 16/020,891

(22) Filed: Jun. 27, 2018

(65) Prior Publication Data

US 2019/0007843 A1    Jan. 3, 2019

Related U.S. Application Data

(60) Provisional application No. 62/526,302, filed on Jun. 28, 2017.

(51) Int. Cl.
| | | |
|---|---|---|
| *H04W 16/20* | (2009.01) | |
| *H04W 64/00* | (2009.01) | |
| *H04L 12/24* | (2006.01) | |
| *H04W 72/08* | (2009.01) | |
| *H04W 36/30* | (2009.01) | |
| *H04W 24/02* | (2009.01) | |

(52) U.S. Cl.
CPC .......... *H04W 16/20* (2013.01); *H04L 41/0823* (2013.01); *H04L 41/0896* (2013.01); *H04W 24/02* (2013.01); *H04W 36/30* (2013.01); *H04W 64/003* (2013.01); *H04W 72/085* (2013.01)

(58) Field of Classification Search
CPC .......... H04L 41/0823; H04L 41/0896; H04W 4/029; H04W 16/20; H04W 24/02; H04W 36/30; H04W 64/00; H04W 64/003; H04W 72/085; H04W 88/08
See application file for complete search history.

(56) References Cited

U.S. PATENT DOCUMENTS

| | | | |
|---|---|---|---|
| 6,240,463 B1 | 5/2001 | Benmohamed et al. | |
| 7,496,070 B2 * | 2/2009 | Vesuna ................. | H04W 16/18 370/331 |
| 8,126,476 B2 * | 2/2012 | Vardi .................... | H04W 72/02 455/456.1 |

(Continued)

FOREIGN PATENT DOCUMENTS

| | | | | |
|---|---|---|---|---|
| CN | 101641978 A | * | 2/2010 | ........... H04W 16/20 |
| CN | 102790974 A | * | 11/2012 | |

(Continued)

OTHER PUBLICATIONS

Yang et al., Optimal Network Design: the Base Station Placement Problem, Dec. 12, 1997, IEEE, Proceedings of the 36th IEEE Conference on Decision and Control (Year: 1997).*

(Continued)

*Primary Examiner* — Eric Nowlin
(74) *Attorney, Agent, or Firm* — Erickson Kernell IP, LLC

(57) ABSTRACT

Systems and methods provide real-time feedback of the effect of changes in router placement and physical configuration on the overall quality of device connections. This feedback assists a user to improve placement and physical configuration, until an optimal positioning or configuration is found.

14 Claims, 6 Drawing Sheets

(56) References Cited

U.S. PATENT DOCUMENTS

| | | | | |
|---|---|---|---|---|
| 8,614,956 | B2* | 12/2013 | Baliga | H04W 16/18 370/243 |
| 8,654,672 | B1* | 2/2014 | Nicholas | H04W 40/246 370/254 |
| 8,787,930 | B2* | 7/2014 | Ahmad | G01S 5/14 455/41.2 |
| 9,602,345 | B2* | 3/2017 | Saha | H04L 41/0823 |
| 9,781,608 | B2* | 10/2017 | Dore | H04W 16/20 |
| 9,888,360 | B2* | 2/2018 | Sharma | G01S 5/0236 |
| 9,935,833 | B2* | 4/2018 | McAllister | H04L 41/0823 |
| 2003/0003920 | A1* | 1/2003 | Sebastian | H04W 28/20 455/452.1 |
| 2006/0002326 | A1* | 1/2006 | Vesuna | H04W 16/18 370/328 |
| 2008/0182583 | A1* | 7/2008 | Le | H04W 16/20 455/446 |
| 2009/0042557 | A1* | 2/2009 | Vardi | H04W 72/02 455/422.1 |
| 2009/0168687 | A1* | 7/2009 | Li | H04B 7/2606 370/315 |
| 2010/0014496 | A1* | 1/2010 | Kalika | H04N 21/4126 370/338 |
| 2010/0054750 | A1* | 3/2010 | Forgheri | H04B 10/69 398/136 |
| 2010/0239259 | A1* | 9/2010 | Forghieri | H04J 14/007 398/79 |
| 2012/0014288 | A1* | 1/2012 | Dore | H04W 16/20 370/255 |
| 2012/0058734 | A1* | 3/2012 | Perthold | H04B 17/336 455/67.13 |
| 2012/0108246 | A1* | 5/2012 | Monogioudis | H04W 16/18 455/446 |
| 2012/0122475 | A1* | 5/2012 | Ahmed | G01S 5/14 455/456.1 |
| 2012/0230206 | A1* | 9/2012 | Baliga | H04W 16/18 370/243 |
| 2014/0273877 | A1* | 9/2014 | Corson | H04W 24/06 455/67.13 |
| 2014/0334318 | A1* | 11/2014 | Pica | H04W 24/02 370/252 |
| 2014/0357282 | A1* | 12/2014 | Selim | H04W 16/18 455/446 |
| 2014/0357283 | A1* | 12/2014 | Almoghathawi | H04W 16/18 455/446 |
| 2014/0357284 | A1* | 12/2014 | Almoghathawi | H04W 16/18 455/446 |
| 2014/0376529 | A1* | 12/2014 | Ramachandran | H04W 16/18 370/338 |
| 2015/0341211 | A1* | 11/2015 | Saha | H04L 41/0823 709/221 |
| 2015/0365833 | A1* | 12/2015 | Stafford | H04W 24/02 370/252 |
| 2016/0301460 | A1* | 10/2016 | Ali | H04B 1/0458 |
| 2017/0041078 | A1* | 2/2017 | Le | H04B 10/2543 |
| 2018/0249341 | A1* | 8/2018 | Park | H04B 17/318 |
| 2019/0200245 | A1* | 6/2019 | Khan | H04W 64/003 |
| 2019/0230587 | A1* | 7/2019 | Gilson | H04W 36/0069 |
| 2020/0037381 | A1* | 1/2020 | Ross | H04W 76/15 |

FOREIGN PATENT DOCUMENTS

| | | | | |
|---|---|---|---|---|
| CN | 104053215 | A | * 9/2014 | H04W 48/20 |
| CN | 102790974 | B | * 1/2015 | |
| CN | 105657760 | A | * 6/2016 | |
| CN | 104053215 | B | * 4/2018 | |
| CN | 108401256 | A | * 8/2018 | |
| CN | 105657760 | B | * 3/2019 | |
| GB | 2484115 | A | * 4/2012 | H04W 48/20 |
| GB | 2484115 | B | * 2/2013 | H04W 48/20 |
| KR | 20120051812 | A | * 5/2012 | G01S 5/14 |
| KR | 101424747 | B1 | * 8/2014 | G01S 5/14 |
| WO | WO-2012122550 | A2 | * 9/2012 | H04W 16/18 |
| WO | WO-2012122550 | A3 | * 11/2012 | H04W 16/18 |
| WO | WO-2015188583 | A1 | * 12/2015 | H04W 48/20 |

OTHER PUBLICATIONS

Wright, Optimization Methods for Base Station Placement in Wireless Applications, May 21, 1998, IEEE, VTC '98. 48th IEEE Vehicular Technology Conference. Pathway to Global Wireless Revolution (Cat. No. 98CH36151), DOI: 10.1109/VETEC.1998.686601 (Year: 1998).*

Tripathi et al., Analysis of Weights for Optimal Positioning of Base Station in a Wireless Sensor Network, Mar. 2, 2014, IEEE, 2014 Twentieth National Conference on Communications (NCC) (Year: 2014).*

Taufiq et al., Wireless LAN Access Point Placement Based on User Mobility, Apr. 9, 2011, Springer, Wireless Pers Commun (2011) 60:431-440, DOI: 10.1007/s11277-011-0300-0 (Year: 2011).*

Stamateios et al., Spectral Efficiency and Optimal Base Placement for Indoor Wireless Networks, May 1996, IEEE, IEEE Journal on Selected Areas in Communications, pp. 651-661, DOI: 10.1109/49.490416 (Year: 1996).*

Prommak et al., Network Design for Quality of Services in Wireless Local Area Networks: a Cross-layer Approach for Optimal Access Point Placement and Frequency Channel Assignment, Jul. 4, 2007, Proceedings of the World Congress on Engineering 2007, vol. 2 (Year: 2007).*

Maksuriwong et al., Wireless LAN Access Point Placement using a Multi-Objective Genetic Algorithm, Oct. 8, 2003, IEEE, SMC' 03 Conference Proceedings. 2003 IEEE International Conference on Systems, Man and Cybernetics. Conference Theme—System Security and Assurance, DOI: 10.1109/ICSMC.2003.1 (Year: 2003).*

Kouhbor et al., Optimal Placement of Access Point in WLAN Based on a New Algorithm, Jul. 13, 2005, IEEE, International Conference on Mobile Business (ICMB'05), DOI: 10.1109/ICMB.2005.75 (Year: 2005).*

Gibney et al., A Wireless Local Area Network Modeling Tool for Scalable Indoor Access Point Placement Optimization, Apr. 2010, Society for Computer Simulation International, SpringSim '10: 2010 Spring Simulation Conference, DOI: 10.1145/1878537.1878707 (Year: 2010).*

Farkas et al., Optimization of Wi-Fi Access Point Placement for Indoor Localization, Dec. 7, 2012, IEEE, 2012 IEEE Global Communications Conference (GLOBECOM), DOI: 10.1109/GLOCOM.2012.6503906 (Year: 2012).*

Fang et al., A Novel Access Point Placement Approach for WLAN-based Location Systems, Apr. 21, 2010, IEEE, 2010 IEEE Wireless Communication and Networking Conference, DOI: 10.1109/WCNC.2010.5506586 (Year: 2010).*

Eisenblatter et al., Integrated Access Point Placement and Channel Assignment for Wireless LANs in an Indoor Office Environment, Jun. 21, 2007, IEEE, 2007 IEEE International Symposium on a World of Wireless, Mobile and Multimedia Networks, DOI: 10.1109/WOWMOM.2007.4351711 (Year: 2007).*

Bhuwania et al., Positioning WiFi Access Points Using Particle Swarm Optimization, Sep. 25, 2016, IEEE, 2016 Second International Conference on Research in Computational Intelligence and Communication Networks (ICRCICN), DOI: 10.1109/ICRCICN.2016.7813641 (Year: 2016).*

Battiti et al., Optimal Wireless Access Point Placement for Location-Dependent Services, Oct. 2003, Technical report DIT-03-052, Universitsa di Trento, (Year: 2003).*

Alsmady et al., Optimal Wi-Fi Access Point Placement for RSSI-Based Indoor Localization Using Genetic Algorithm, Apr. 6, 2017, IEEE, 2017 8th International Conference on Information and Communication Systems (ICICS), DOI: 10.1109/IACS.2017.7921986 (Year: 2017).*

Ibrahim et al., Optimal Wireless Access Points Placement in a Manufacturing Facility using Genetic Algorithm, Sep. 29, 2018, IEOM Society International, Proceedings of the International Conference on Industrial Engineering and Operations Management (Year: 2018).*

(56) References Cited

OTHER PUBLICATIONS

Kazakovtsev, Access Point Placement as a Discrete Optimization Problem, Aug. 2012, Siberian Federal University, <https://www.researchgate.net/publication/230775196_Access_Points_Placement_as_a_Discrete_Optimization_Problem/citation/download> (accessed on Feb. 7, 2020) (Year: 2012).*

Sharma et al., Access point placement for fingerprint-based localization, Nov. 19, 2010, IEEE, 2010 IEEE International Conference on Communication Systems, DOI: 10.1109/ICCS.2010.5686092 (Year: 2010).*

Eldeeb et al., Optimal placement of access points for indoor positioning using a genetic algorithm, Dec. 20, 2017, IEEE, 2017 12th International Conference on Computer Engineering and Systems (ICCES), DOI: 10.1109/ICCES.2017.8275323 (Year: 2017).*

Chen et al., Placement of Access Points for Indoor Wireless Coverage and Fingerprint-Based Localization, Nov. 15, 2013, 2013 IEEE 10th International Conference on High Performance Computing and Communications & Embedded and Ubiquitous Computing, DOI: 10.1109/HPCC.and.EUC.2013.323 (Year: 2013).* https://web.archive.org/web/20170509032100/https://play.google.com/store/apps/details?id=com.farproc.wifi.analyzer&hl=en. Accessed Sep. 25, 2018.

\* cited by examiner

OPTIMAL WIRELESS ROUTER POSITIONING

CROSS-REFERENCE TO RELATED APPLICATIONS

This Application claims priority to U.S. Provisional Patent Application Ser. No. 62/526,302, filed on Jun. 28, 2017, entitled "Optimal Wireless Router Positioning,", the entire disclosure of which is incorporated herein by reference.

FIELD

The disclosure relates generally to computer systems and networks, and more particularly, to optimal positioning of a wireless routers in a network of computers.

BACKGROUND

A router is a networking device that forwards data packets between computer networks. Wireless routers, also referred to as wireless access points, are used to connect devices to computer networks wirelessly, using radio frequency spectrum, and are commonly found on business premises and consumer homes. The main job of a wireless router is to provide wireless internet connectivity. A major source of dissatisfaction with wireless routers is inadequate coverage.

Because wireless routers and their connected devices are commonly dispersed among many different rooms and levels in a home or business, it can be difficult to find the optimal physical positioning and configuration of a wireless router. Optimization of router placement is accomplished crudely by trial and error, or neglected altogether.

BRIEF DESCRIPTION OF THE DRAWINGS

For a better understanding of the inventive subject matter, reference may be made to the accompanying drawings in which.

DETAILED DESCRIPTION

Figure 1:
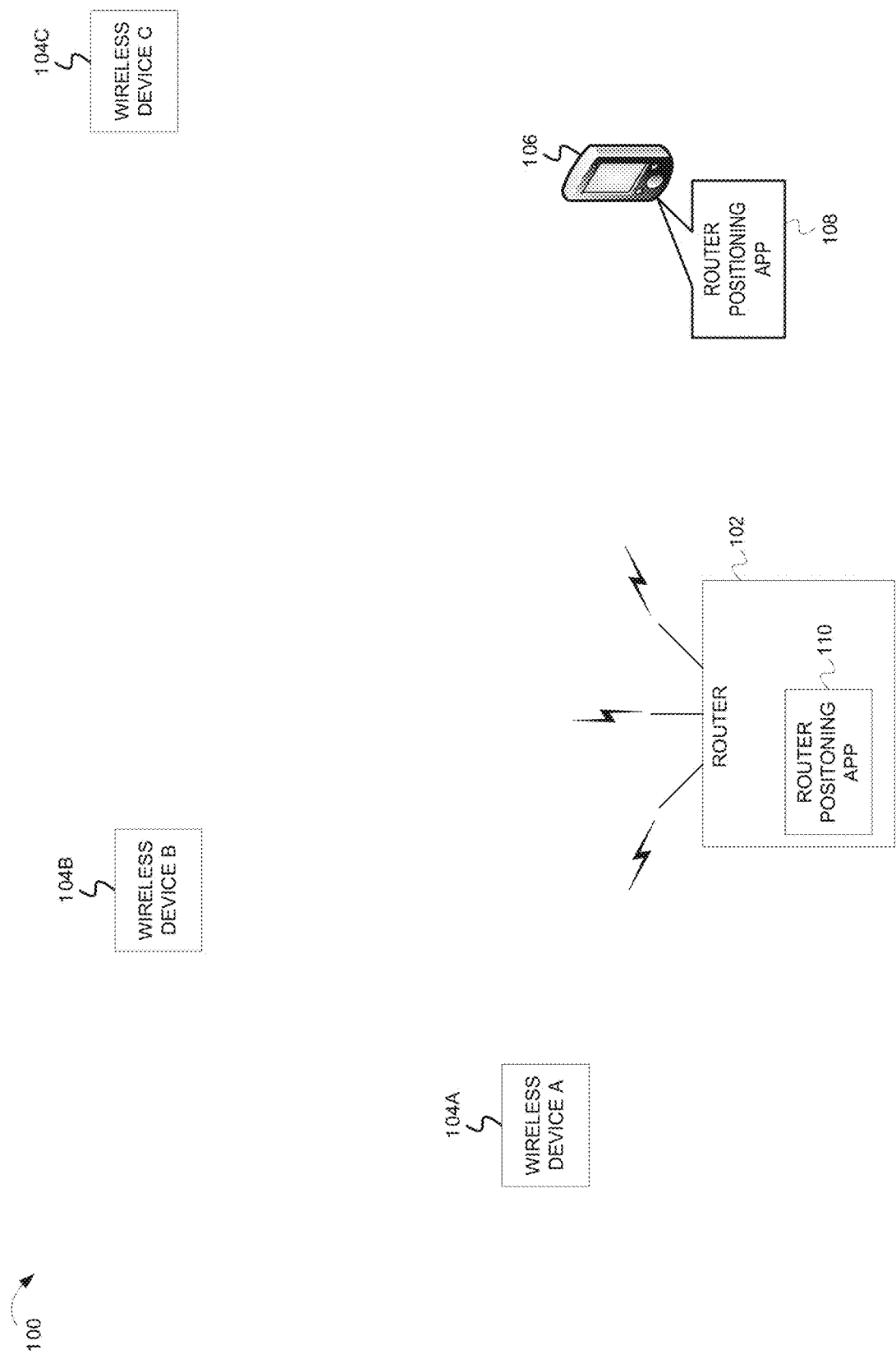
FIG. 1 is a block diagram illustrating a system for optimal wireless router positioning according to embodiments.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

FIG. 1 is a block diagram illustrating a system 100 for optimal wireless router positioning according to embodiments. In some embodiments, system 100 includes a router 102, wireless devices 104, and optionally, a mobile device 106. Wireless devices 104 and mobile device 106 can be wirelessly coupled to router 102. Various technologies may be used to couple wireless devices 104 and mobile device 106 with router 102. For example, the wireless technology can include any of WLAN (also referred to as IEEE 802.11 or Wi-Fi), Bluetooth®, WiMAX, ZigBee®, etc.

A wireless device 104 can be any type of wireless device that can be communicably coupled to router 102. A wireless device can also be referred to as a node or station of the wireless network. Examples of wireless devices include mobile devices (e.g., smart phones, personal digital assistants, music players etc.), laptop devices, tablet devices, desktop computers, server computers, televisions, set-top boxes, game consoles, Internet of Things (IoT) devices etc. The inventive subject matter is not limited to any particular type of wireless device.

Router 102 can receive data packets and forward them to the appropriate destination network or wireless device. For example, a router can receive packets from the Internet, and forward them to wireless devices on a home or business network. Router 102 can also route packets from one wireless device on the wireless network and forward them to another wireless device on the same wireless network. In some embodiments, router 102 can be an access point of a wireless network.

The physical positioning of a wireless router can have a significant influence on the efficiency of its connection to wireless devices. Rotation, angle, location and height of placement, as well as configuration of any external antennas can all affect data throughput to wireless devices. Adjusting the physical positioning of a router, including these mentioned factors, can significantly improve the performance of connected wireless devices.

A router positioning app (108, 110) can be used assist users in determining if a router is optimally positioned. For example, a mobile device 106 may have a router positioning app 108 installed that receives data used to determine if router 102 is optimally positioned. Alternatively, router 102 may have a router positioning app 110 that provides feedback that can be used to determine if the router 102 is optimally positioned.

FIG. 1 illustrates three wireless devices, 104A-104C. Those of skill in the art having the benefit of the disclosure will appreciate that a network may have fewer or more that three wireless devices.

It should be noted that as used herein, an optimal configuration or optimal position means that the configuration or position is better that previous configurations or positions. Optimal does not necessarily mean that a position or configuration is the absolute best position or configuration for the router.

Figure 2:
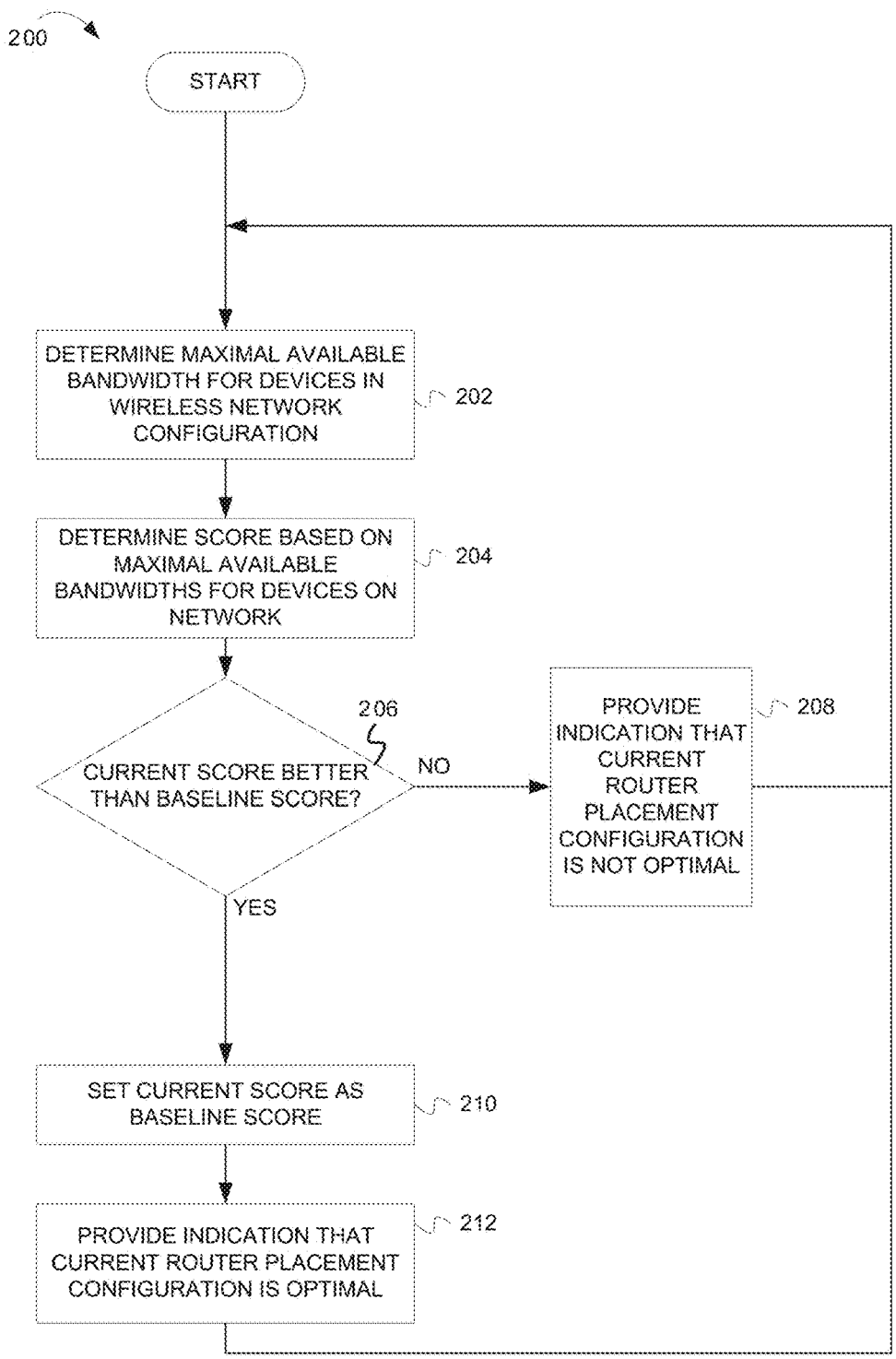
FIG. 2 is a flow chart illustrating operations of a method for optimal wireless router positioning according to embodiments.
Figure 3:
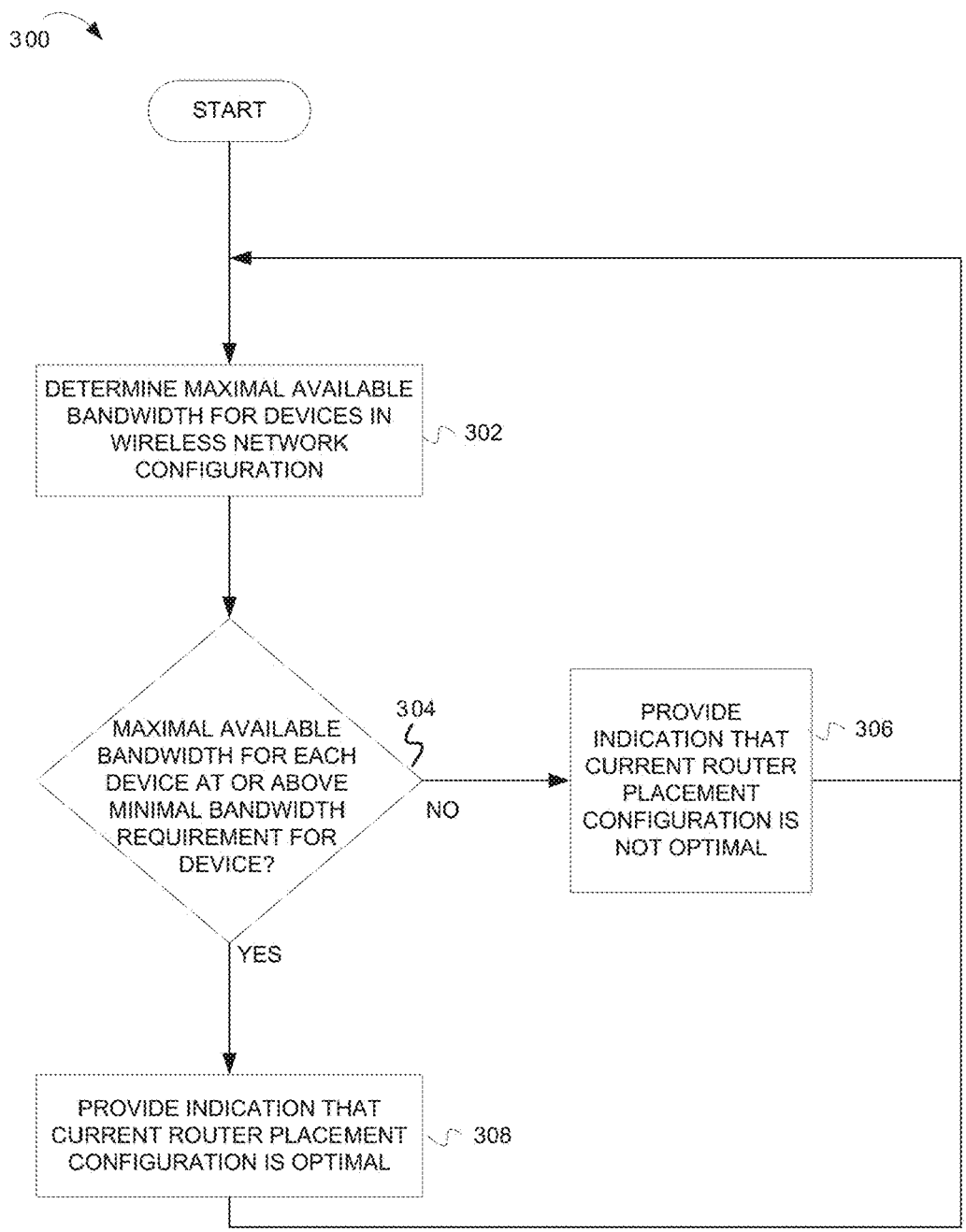
FIG. 3 is a flow chart illustrating operations of a method for optimal wireless router positioning according to alternative embodiments.

Further details on the operations of devices within system environment 100 are provided below with respect to FIGS. 2 and 3. FIG. 2 describes aspects of embodiments where the router configuration is optimized for all devices in the network. FIG. 3 describes aspects of alternative embodiments where the router configuration is optimized with respect to specific constraints for the devices.

FIG. 2 is a flow chart 200 illustrating operations of a method for optimal wireless router positioning according to embodiments where the router configuration is optimized for all devices in a wireless network. In some embodiments, the method illustrated in FIG. 2 can be performed by a router positioning app (108, 110).

At block 202, a router positioning app (e.g., router positioning app 108 or 110) can determine a maximal available (i.e., achievable) bandwidth for wireless devices on a wireless network communicably coupled to a router 102. For example, for n wireless devices: $D_1, \ldots, D_n$, the router positioning app obtains n values $C_1, \ldots, C_n$ corresponding to the maximal bandwidth available in the current configuration for each device. In some embodiments, a signal quality value such as a Signal Noise Ratio (SNR) and the wireless protocol in use on the network can be used to compute the maximal available bandwidth at a wireless device $D_i$. In particular, with B being the theoretical bandwidth of the channel in Hertz, the maximal achievable bandwidth C is bounded by the following formula:

$$C = B * \log2\left(\frac{S}{N} + 1\right),$$

which is known as the Shannon-Hartley theorem. In this formula, B is the bandwidth of the channel in hertz, S is the signal power, and N is the power of the noise and/or interference. This bandwidth is further dependent on the WiFi protocol being used, in particular the modulation technique and the bandwidth used by the WiFi protocol. SNR can be measured directly at the device or can be derived straightforwardly from the Received Signal Strength Indicator (RSSI). The SNR and/or RSSI can be obtained from the router, or it can be obtained from the other devices on the network.

At block 204, the router positioning app determines a score $S_j$ based on the maximal available bandwidths determined at block 202, where "j" is an index in a series of scores that have been determined at various points in time where the router configuration or positioning may have changed. The score can represent how "good" the current router configuration or positioning is. For example, $S_0$ can be an initial baseline score determined when the router initially powers up or reboots. In some embodiments, a score $S_j$, can be determined as the sum of the maximal available bandwidth for each device. That is:

$$S_j = \Sigma_{i=1}^{n} C_i$$

Optionally, this score function can be a weighted function, where the user can define a relative importance of each device. In this case the score function becomes:

$$S_j = \Sigma_{i=1}^{n} W_i C_i$$

where $W_i$ is the assigned relative weight of device $D_i$. In some embodiments:

$$\Sigma_{i=1}^{n} W_i = 1$$

At block 206, a determination is made as to whether the current score $S_j$ is better than a previous baseline score. If the current score is not better than the previous baseline, then the method proceeds to block 208. If the current score is better than the previous score, then the method proceeds to block 210.

At block 208, the router positioning app can provide feedback indicating that the current score is less than the previous baseline score, thus the current positioning or configuration of the router is not optimal. As an example, a router positioning app 110 on the router 102 can cause a light to be turned off, or to change color (i.e., from green to red) to indicate that the current positioning or configuration of the router is not optimal. In the case of a router positioning app 108 on a mobile device, a user interface can present a graph, light, or other indicator to provide feedback to the user that the current router positioning or configuration is not optimal. The method can then proceed to block 202 to recalculate the score, for example, when the router, or antennas on the router, are rotated or otherwise repositioned.

Block 210 is reached when the score calculated at block 204 is better than a current baseline score, thereby indicating the current position or configuration of the router is optimal. At block 210, the current score is set as the new baseline score $S_0$.

At block 212, the router positioning app can provide feedback indicating that the current positioning or configuration is optimal. For example, a router positioning app 110 on the router 102 can cause a light to be turned on, or to change color (i.e., from red to green) to indicated that the current positioning or configuration of the router is optimal. In the case of a router positioning app 108 on a mobile device, a user interface can present a graph, light, or other indicator to provide feedback to the user that the current router positioning or configuration is optimal. The method can then proceed from block 210 to block 202 to recalculate the score, for example, when the router is rotated or otherwise repositioned.

The method illustrated in FIG. 2 can be repeated with every new attempt of the user to optimize the router configuration. As can be seen from the above, when the antenna or the router is rotated or otherwise repositioned, a new score can be computed that represents the score of the newly obtained router configuration. SNR typically changes when the router is repositioned. A router positioning app (108, 110) can monitor the SNR, and in response to detecting a change, cause a new score to be determined. Hence, a series of scores: $S_0, \ldots, _j$ with j being the number of times that the router or router antenna position is changed (i.e., rotated). That is, a router configuration and its corresponding score $S_j$, with $0<j \leq k$, is better when $S_0 < S_j$. Then, feedback to the user is provided and the newly obtained optimal router score is stored and set as the new baseline.

FIG. 3 is a flow chart 300 illustrating operations of a method for optimal wireless router positioning according to alternative embodiments where the router configuration is optimized with respect to specific constraints for devices in the wireless network. Some or all of the devices in the wireless network may have minimum bandwidth constraints. For example, a full HD video player typically demands more bandwidth than a smart thermostat. The minimum bandwidth requirements can be determined in various ways. For example, minimum bandwidth information can be obtained from user input. Alternatively, the minimum bandwidth requirements can be determined automatically by inferring the type of device. One method for inferring the type of device is described in U.S. Provisional Patent Application Ser. No. 62/440,321 entitled "DETECTING UNKNOWN IOT DEVICE TYPES BY MONITORING THEIR BEHAVIOR," filed on Dec. 29, 2016 which is hereby incorporated by reference. In some embodiments, the method illustrated in FIG. 3 can be performed by a router positioning app (108, 110).

At block 302, a router positioning app (108, 110) can determine a maximal available bandwidth for wireless devices on a wireless network communicably coupled to a router 102. For example, for n wireless devices: $D_1, \ldots, D_n$, the router positioning app obtains n values $C_1, \ldots, C_n$ corresponding to the maximal bandwidth available in the current configuration for each device. As noted above, in some embodiments, a SNR and the wireless protocol in use on the network can be used to compute the maximal available bandwidth at a wireless device $D_i$. SNR can be measured directly at the device or can be derived straightforwardly from the RSSI.

At block 304, a check is made to determine if the devices on the wireless network each have at least as much bandwidth available as is required by their respective minimal bandwidth constraints. The check can be represented by determining if:

$$M_i < C_i, 1 \leq i \leq n$$

Where $M_i$ is the minimum required bandwidth for device for device i, $C_i$ is the maximal available bandwidth for device i as determined at block 302, and n is the number of devices detected in the wireless network.

If the check at block 304 determines that one or more of the devices do not have their minimum required bandwidth, the method proceeds to block 306, where the router positioning app can provide an indicator that the current positioning or configuration of the router is not optimal. As an example, a router positioning app 110 on the router 102 can cause a light to be turned off, or to change color (i.e., from green to red) to indicated that the current positioning or configuration of the router is not optimal. In the case of a router positioning app 108 on a mobile device, a user interface can present a graph, list, light, or other indicator to provide feedback to the user that the current router positioning or configuration is not optimal. The router positioning app can also indicate which of the devices do not have their minimal required bandwidth. For example, the router positioning app 108 can provide a list of devices where $M_i > C_i$. The method can then proceed to block 302 to recalculate the score, for example, when the router is rotated or otherwise repositioned.

If the check at block 304 determines that each of the devices detected on the wireless network have their minimum required bandwidth, the method proceeds to block 308, where the router positioning app can provide an indicator the current positioning or configuration is optimal. For example, a router positioning app 110 on the router 102 can cause a light to be turned on, or to change color (i.e., from red to green) to indicated that the current positioning or configuration of the router is optimal. In the case of a router positioning app 108 on a mobile device, a user interface can present a graph, light, or other indicator to provide feedback to the user that the current router positioning or configuration is optimal. The method can then proceed to block 302 to recalculate the current maximal available bandwidths for the devices in the wireless network, for example, when the router is rotated or otherwise repositioned.

Figure 4:
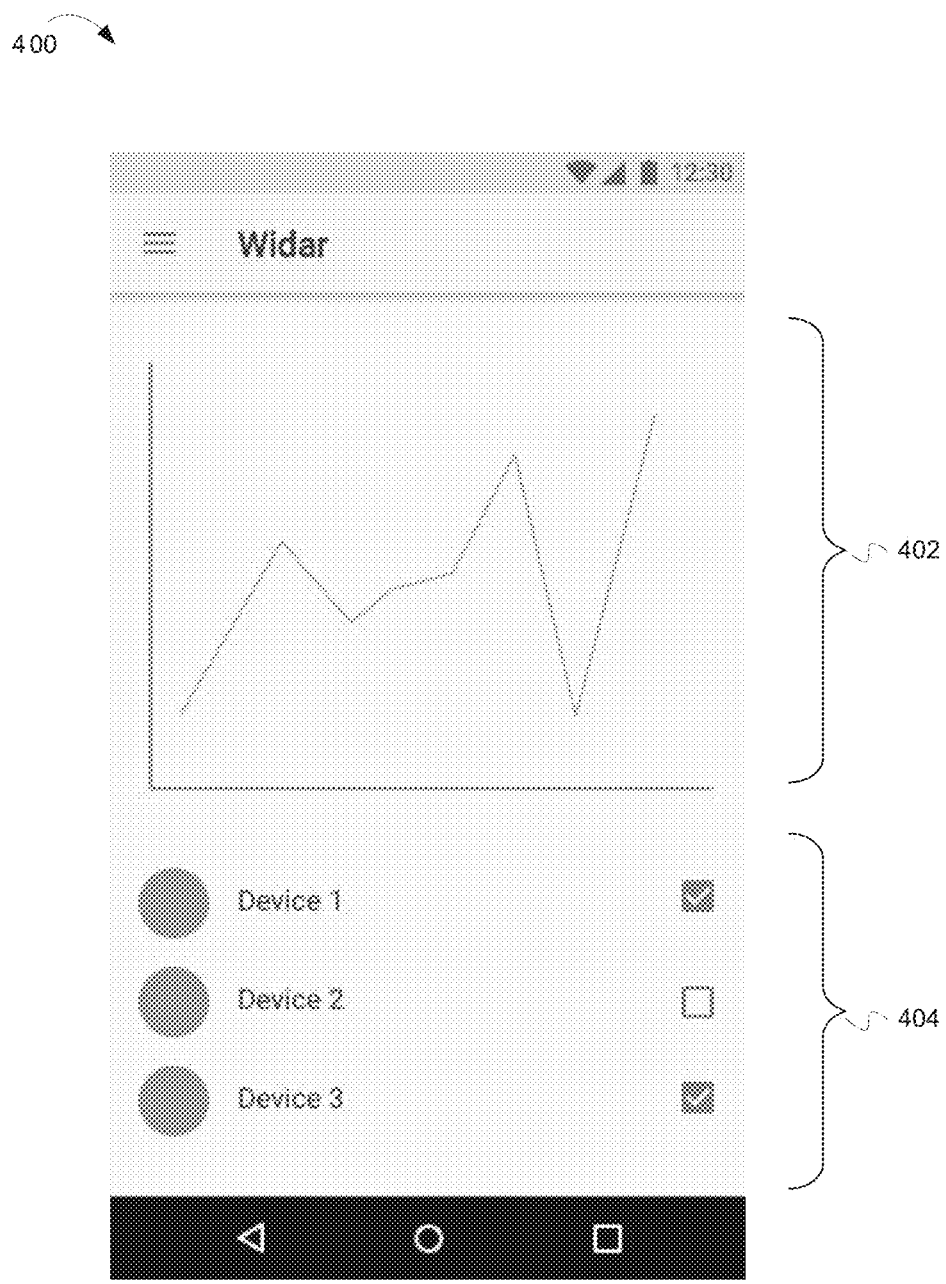
FIG. 4 is an example user interface for optimal wireless router positioning according to embodiments.

FIG. 4 is an example user interface 400 for optimal wireless router positioning according to embodiments. In some embodiments, the example user interface 400 may be provided on a mobile device such as a smart phone, tablet computer, or laptop computer. The example user interface includes a graph area 402 that can display a history of signal quality (i.e., the score determined per the method of FIG. 2) over time. Area 404 of the user interface 400 can display a list of devices detected in the wireless network, and can also provide a checkbox or other user interface element that provides a mechanism for a user to indicate whether or not the corresponding device is to be included for purposes of determining whether the router positioning is optimal or not. The list of devices can be obtained from the router. In the example user interface 400, data obtained for "Device 2" is not included in determining whether or not the current router positioning is optimal. In addition, devices in the list can be color coded, or have other indicia that indicate whether or not the device's currently available bandwidth meets its configured minimum bandwidth requirements.

Figure 5:
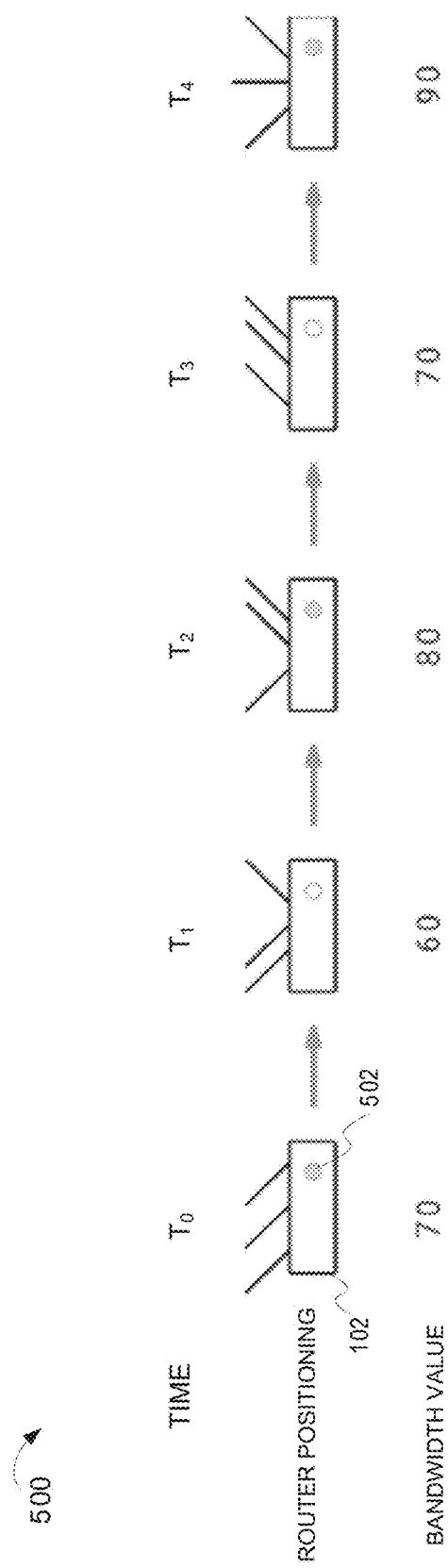
FIG. 5 illustrated an example sequence of router configuration scores over time.

FIG. 5 illustrates an example sequence 500 of router configuration scores over time. The example sequence 500 provides a graphical simulation of router antennae positioning at five points in time, $T_0$-$T_4$, and the associated bandwidth value as determined by the method described above with respect to FIG. 2. At time $T_0$ (which could be when the router 102 is powered on or rebooted, the bandwidth value is 70. As this is the first iteration of the method, the value is the new baseline. In the example sequence 500, the router positioning app causes a light 502 (represented by a shaded circle on the router) to be lit indicating that the router positioning is optimal. At times $T_1$-$T_4$, the user repositions the router antennae, causing the bandwidth scores to change. For example, at times $T_1$ and $T_3$, the current bandwidth scores dropped below the current baseline value, causing the light on the router to change to an unlit status. At times $T_2$ and $T_4$, the current bandwidth score exceeded the current baseline. The current baseline score is updated with the current bandwidth score, and the router light is lit to indicate the current positioning is optimal. In alternative embodiments, a row of indicators can be used to provide a more graphic and granular representation of bandwidth, with the number of consecutive illuminated indicators corresponding to current bandwidth score.

As can be seen from the above, the systems and methods described herein can provide for a more efficient distribution of data to various devices on a wireless network. The systems and methods provide a user with feedback regarding the current router positioning. The feedback can be used to position or configure the router in such a way as to optimize the transmission of data to nodes on the network, and to ensure that nodes on the network receive their respective minimal bandwidth.

The above discussion has been provided in the context of determining an optimal position for a router. Those of skill in the art having the benefit of the disclosure will appreciate the methods described above could be applied to determining other optimal configuration parameters. For example, a new score could be calculated based on a change in the channel, MTU, or other configuration parameters.

It will be appreciated from the above that various embodiments described herein can provide improvements over conventional systems and trial and error methods. For example, the embodiments can enable a user to more quickly establish an optimal router position or configuration for router in a wireless network. Further, the various embodiments can result in improvement of the operation of the network itself. For example, the aggregate bandwidth of the wireless network may be improved when a router is positioned using an embodiment. Alternatively, performance of devices on the network may be improved, or the devices can be enabled to achieve their intended functionality using embodiments to position a router such that the minimum required bandwidth of the devices is met.

Figure 6:
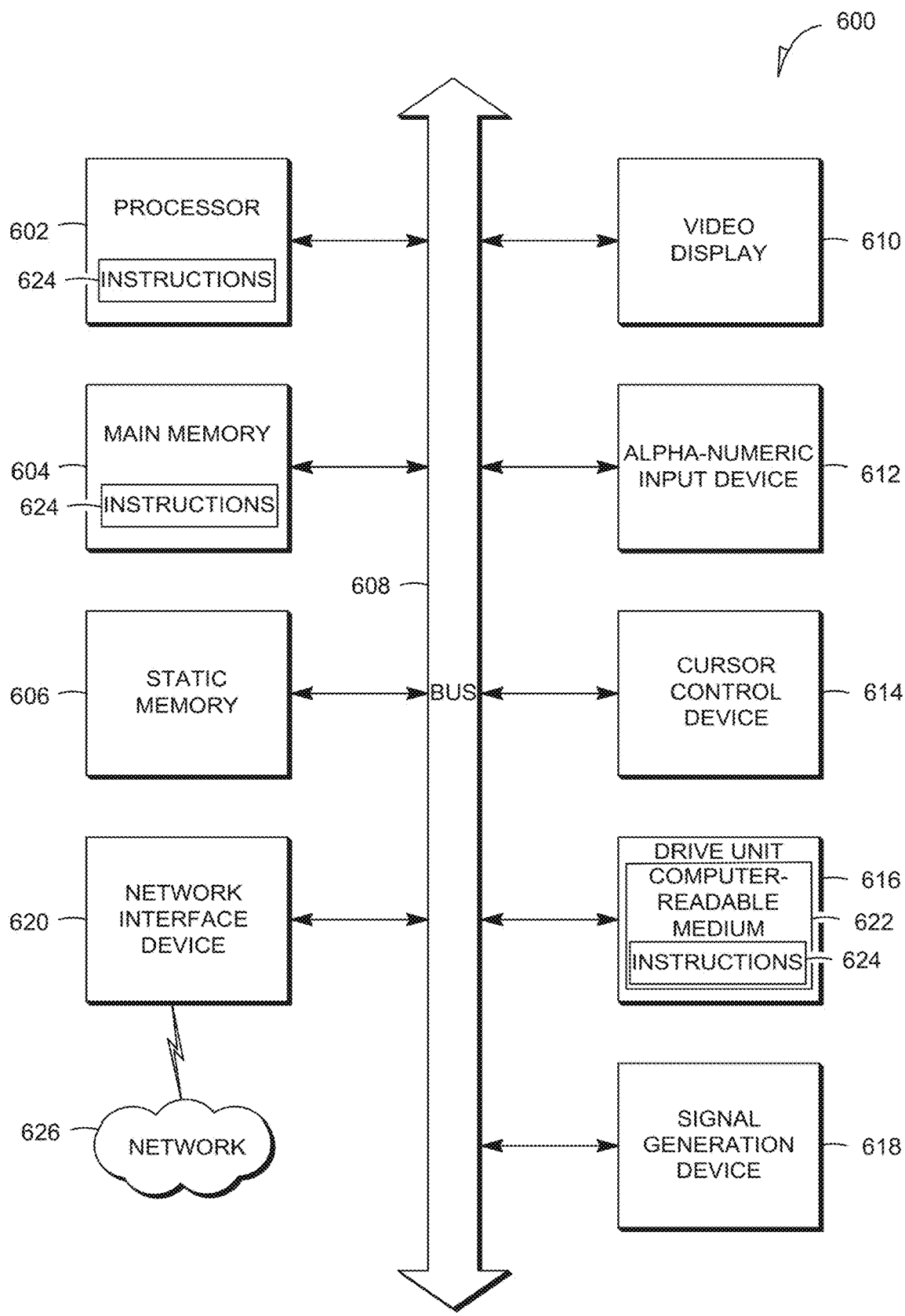
FIG. 6 is a block diagram of an example embodiment of a computer system upon which embodiments of the inventive subject matter can execute.

FIG. 6 is a block diagram of an example embodiment of a computer system 600 upon which embodiments of the inventive subject matter can execute. The description of FIG. 6 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

With reference to FIG. 6, an example embodiment extends to a machine in the example form of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a signal transmission medium via the network interface device 620 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for wireless router positioning, the method comprising:
    receiving by a processor via a network interface, a one or more signal quality values for each of one or more devices communicably coupled to a wireless router via a wireless network;
    determining, by the processor, a maximal available bandwidth for each of the one or more devices based, at least in part, on the signal quality values;
    determining, by the processor, a current score based, at least in part, on the determined maximal available bandwidth for each of the one or more devices and based, at least in part, on the signal quality values in response to detecting a change in a signal-to-noise ratio;
    comparing, by the processor, the current score to a baseline score; and
    in response to determining that the current score exceeds the baseline score, providing an indication to a user that a current positioning of the wireless router is optimal.

2. The method of claim 1, further comprising resetting the baseline score to the current score.

3. The method of claim 1, wherein the signal quality values comprise signal strengths between the wireless router and each of the one or more devices.

4. The method of claim 1, wherein determining, by the processor, the current score includes determining the current score based, at least in part, on the determined maximal available bandwidth for each device of the one or more devices and a weighting for each device of the one or more devices, each weighting associated with one device of the one or more devices.

5. A method for wireless router positioning, the method comprising:
    receiving, by a processor, a set of signal quality values for one or more devices on a wireless network;
    determining a maximal available bandwidth for each of the one or more devices based, at least in part, on the set of signal quality values;
    comparing, by the processor, the maximal available bandwidth with a minimum required bandwidth for each of the one or more devices; and
    in response to determining that the maximal available bandwidth meets the minimum required bandwidth for each of the one or more devices, providing an indication that a current positioning of the wireless router is optimal; and
    determining, by the processor, a current score based, at least in part, on the signal quality values in response to detecting a change in a signal-to-noise ratio.

6. The method of claim 5, wherein the set of signal quality values comprises signal strengths between the wireless router and the one or more devices.

7. A non-transitory machine-readable medium having stored thereon executable instructions that, when executed by one or more processors, cause a device to perform operations comprising:
    receive signal quality values for one or more devices communicably coupled to a wireless router via a wireless network;
    detect a change in a signal-to-noise ratio and in response determine a maximal available bandwidth for each of the one or more devices based, at least in part, on the signal quality values;
    determine a current score based, at least in part, on the determined maximal available bandwidth for each of the one or more devices;
    compare the current score to a baseline score; and
    provide an indication to a user that a current positioning of the wireless router is optimal in response to a determination that the current score exceeds the baseline score.

8. The non-transitory machine-readable medium of claim 7, wherein the executable instructions further comprise instructions to reset the baseline score to the current score.

9. The non-transitory machine-readable medium of claim 7, wherein the signal quality values comprise signal strengths between the wireless router and each of the one or more devices.

10. The non-transitory machine-readable medium of claim 7, wherein the executable instructions to determine the current score include instructions to determine the current score based, at least in part, on the determined maximal available bandwidth for each of the one or more devices and a weighting for each of the one or more devices, each weighting associated with a device of the one or more devices.

11. An apparatus comprising:
    one or more processors; and
    a machine-readable medium having stored thereon executable instructions that, when executed by the one or more processors, cause the apparatus to perform operations comprising:

receive signal quality values for one or more devices communicably coupled to at least one of a wireless router and a wireless access point via a wireless network;

determine a maximal available bandwidth for each of the one or more devices based, at least in part, on the signal quality values;

determine a current score based, at least in part, on the determined maximal available bandwidth for each of the one or more devices and based, at least in part, on the signal quality values in response to detecting a change in a signal-to-noise ratio;

compare the current score to a baseline score; and provide an indication to a user that a current positioning of the at least one of the wireless router and the wireless access point is optimal in response to a determination that the current score exceeds the baseline score.

12. The apparatus of claim 11, wherein the apparatus comprises the at least one of the wireless router or the wireless access point.

13. The apparatus of claim 11, wherein the signal quality values comprise signal strengths between the wireless router and each of the one or more devices.

14. The apparatus of claim 11, wherein the executable instructions to determine the current score include instructions to determine the current score based, at least in part, on the determined maximal available bandwidth for each of the one or more devices, each weighting associated with one device of the one or more devices.

\* \* \* \* \*